3,050,403
CANNING OF FISH
Reginald T. Erickson, San Juan Capistrano, Calif., assignor to Star-Kist Foods, Inc., Terminal Island, Calif., a corporation of California
Filed June 3, 1960, Ser. No. 33,806
7 Claims. (Cl. 99—188)

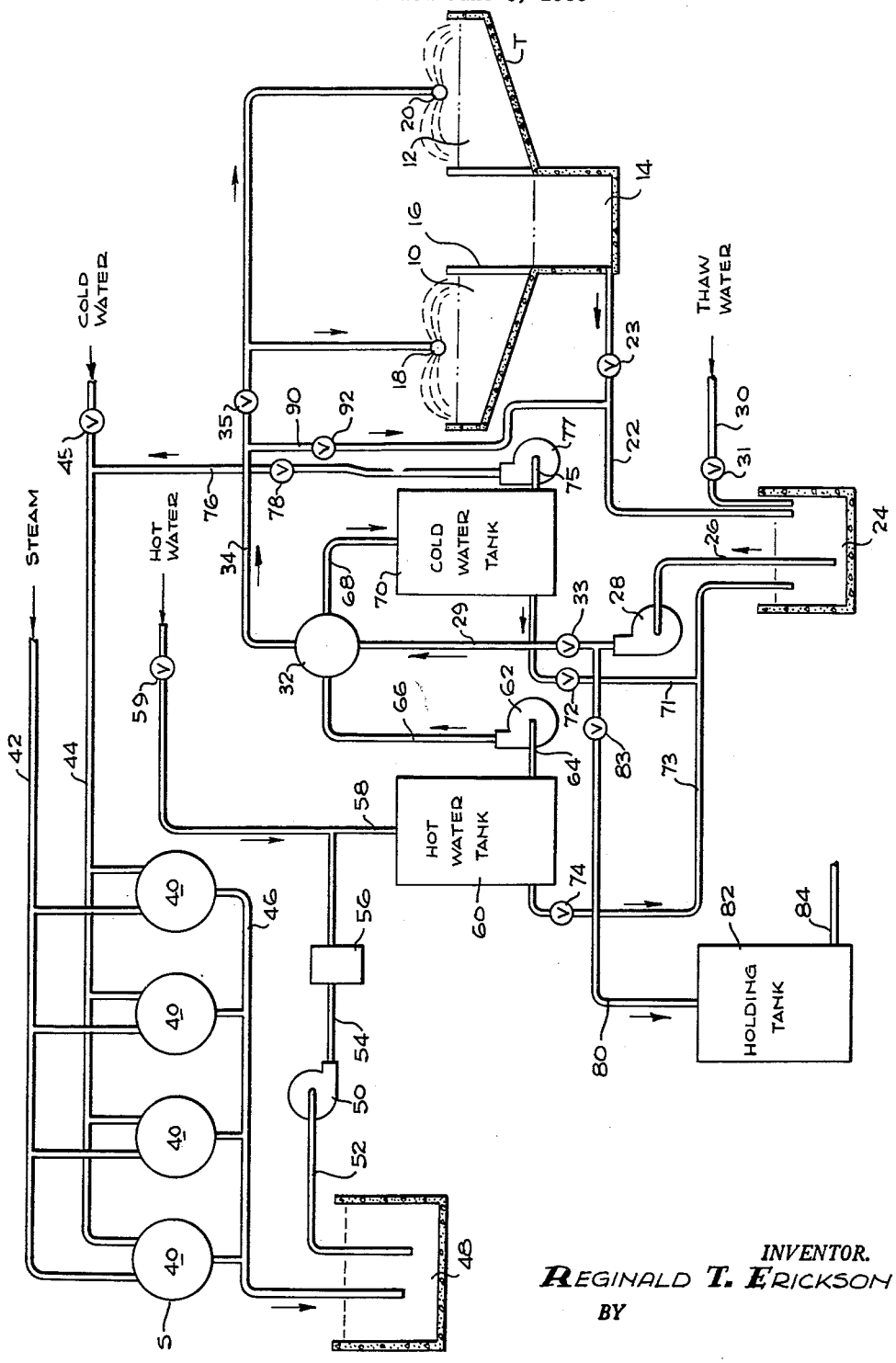

The present invention relates generally to the fishing industry and more particularly to a novel system of canning fish.

The system of the present invention was particularly developed for use in canning tuna and tuna-like fishes, however, such system may likewise be employed with other types of fish.

Another object of the invention is to provide a thawing system for fish canneries which may be readily employed with existing equipment found in a fish canning plant.

A further object of the invention is to provide a thawing system for fish canneries which will make possible more economical operation of a fish canning plant.

Yet a further object of the present invention is to provide a thawing system for fish canneries which will permit the solid material normally extracted from the fish by the thawing water to be utilized in the production of a nutritional product.

Another major object of the present invention is to provide a system for canning fish that permits the reduction or elimination of can "spotting" in the can retort structure of the cannery in a manner to be fully set forth hereinafter.

Further objects and advantages of the present invention will become apparent from the following detailed description, when taken in conjunction with the appended drawing which constitutes a diagrammatic showing indicating a preferred form of system embodying the present invention.

Referring to the right-hand portion of the drawing, the numeral T designates a fish thawing tank structure. This thawing tank structure T receives completely or at least partially frozen fish that are to be eviscerated, precooked, cleaned and then canned. The thawing tank structure T includes fish-receiving bins 10 and 12, the lower portions of which are inclined toward and merge into a trough 14. Fish deposited within the bins 10 and 12 are kept from falling into the trough 14 by means of vertical retaining means 16. Such retaining means are apertured so as to permit thaw water to flow downwardly from the bins 10 and 12 into the trough 14. Disposed above the bins 10 and 12 are nozzle means 18 and 20, respectively, by means of which thaw water may be sprayed over the fish disposed within the bins 10 and 12.

Water from the lower portion of the trough 14 of the thawing tank 10 flows by means of a line 22 to within the confines of a concentrate sump 24. A valve 23 is interposed in line 22. Water from within the concentrate sump 24 is drawn upwardly through a line 26 to the intake of a conventional centrifugal pump 28. The discharge of the pump 28 is directed through a line 29. Seawater may be introduced into the sump 24 through a line 30 having a valve 31.

The end of the line 29 remote from the discharge of pump 28 is in communication with a conventional heat exchanger 32. A valve 33 is interposed in line 29 ahead of the heat exchanger 32. A line 34 extends from the heat exchanger 32 so as to conduct the water forced into the heat exchanger through line 30 to the aforedescribed nozzles 18 and 20. A valve 35 is interposed in line 34.

Referring now to the upper left-hand portion of the drawing, there is disclosed a steam retort structure S of conventional construction. The steam retort structure S includes a plurality of can-receiving chambers 40. These can-receiving chambers 40 receive steam through a line system 42. The can retort chambers 40 also receive chilled cooling water through a line system 44. A valve 45 is disposed at the upstream end of line system 44. The condensate from the chambers 40 as well as the water forced thereinto through the line system 44 is discharged from the chambers by means of a line system 46, with such system emptying into a hot water sump 48.

The interior of the hot water sump 48 is connected to the intake of a second conventional centrifugal pump 50 by means of a line 52. A line 54 is connected to the discharge of the pump 50. Preferably, a conventional filter 56 is interposed in the line 54. The line 54 is connected to a hot water line 58 downstream of the filter 56. A valve 59 is interposed in hot water line 58 upstream of line 54. The line 58 empties into a hot water tank 60. A third conventional centrifugal pump 62 draws water from the lower portion of the hot water tank 60. The discharge of the pump 62 is directed into the aforementioned heat exchanger by means of a line 66. The water forced into the heat exchanger 32 through the line 66 is removed from the heat exchanger by a line 68. The line 68 empties into a cold water tank 70.

The lower portion of the cold water tank 70 is connected to a line 71 having a valve 72. The line 71 intersects a line 73 having a valve 74 that is in communication with the lower portion of the aforementioned hot water tank 60. The line 73 empties into the aforementioned concentrate sump 24. The cold water tank 70 is also connected to the cold water line system 46 by means of lines 75 and 76, a centrifugal pump 77 providing the necessary pressure. A valve 78 is disposed in line 76.

Preferably, the aforementioned line 30 is in communication with a line 80 that empties into a holding tank 82. A valve 83 is disposed in line 80. A line 84 is in communication with the lower portion of the holding tank 82.

It should be understood that the aforementioned lines and line systems may be provided with suitable conventional valves other than those specifically described so as to control the volume and direction of the liquids flowing therethrough. The design and installation of such valving will be readily apparent to those skilled in the art.

In the operation of the preferred method embodying the present invention, the fish to be thawed are deposited in the bins 10 and 12 of the thawing tank structure T. At or prior to this time, the steam retort structure S will have been operating. The condensate received within the can retort chambers 40, as well as the cooling water forced thereinto through the line system 44, will have been directed into the confines of the hot water sump 48. The temperature of the water within this sump 48 may vary between 170 to 190 degrees F. This hot water will be forced by centrifugal pump 50 through lines 52, 54 and filter 56 to the hot water line 58. The hot water line 58 empties into the hot water tank 60. If, for some reason, additional hot water must be supplied to the line 58, this hot water will be forced therethrough from a suitable exterior source (not shown).

The temperature of the water within the hot water tank will usually vary between 170 to 190 degrees F. Water from the confines of this hot water tank is forced by pump 62 through lines 64 and 66 to the heat exchanger 32. This water received by the heat exchanger 32 through line 66 will be discharged from the heat exchanger through line 68 into the cold water tank 70.

The heat of the water flowing into the heat exchanger 32 through line 66 will be transferred to the water entering the heat exchanger through line 29 although these bodies of water are maintained physically isolated. The water entering the heat exchanger through the line 29 is discharged from the heat exchanger through line 34. The temperature of such water entering the heat exchanger through line 29 will be raised by virtue of its heat transfer relationship within the heat exchanger 32 with the hot water entering the heat exchanger through line 66 to approximately 45 to 55 degrees F. This heated water will pass by means of line 34 to the nozzle means 18 and 20 and such water constitutes the thaw water directed onto the fish within the bins 10 and 12. It will be apparent that by proper valving the temperature of the thaw water may be carefully controlled.

The water used for thawing is directed into the concentrate sump 24 by means of line 30. Such thaw water may either be fresh or may be seawater. Generally, however, it will be seawater.

After the thaw water from the nozzles 18 and 20 has passed over the fish to be thawed so as to reduce the temperature thereof it will flow into the trough 14 and thereafter through line 22 into the confines of the concentrate sump 24. By virtue of the contact of the thawing water with the frozen or partially frozen fish its temperature will be reduced to approximately 34 degrees F. This cooled water will be forced upwardly through lines 26 and 29 by the centrifugal pump 28 back to the heat exchanger 32.

The lines 72 and 73 permit any desired transfer of water from the hot water tank 60 or the cold water tank 70, respectively, to the concentrate sump 24. The line 80 permits the thaw water entering the concentrate sump 24 to be transferred to the holding tank 82. The water contained within this holding tank 82 may be redirected to the concentrate sump 24 for successive thawing operations. The line 84 leading from the bottom of the holding tank 82 permits the contents thereof to be removed. Where these contents include a substantial proportion of fish solids extracted by the thaw water, it may be desirable to process such contents so as to obtain a nutritional product. By way of example, such product may take the form of an animal feeding concentrate. Alternatively, the contents of the holding tank 82 may be directed to sewage.

Although the present system may be operated on a batch basis, it also lends itself to a continuous process. Thus, if the valves 31, 45, 72, 74 and 83 are maintained closed, the cold water for cooling the cans in the chambers 40 will be constantly recirculated through the heat exchanger 32. Similarly, the thaw water will also be constantly recirculated through the heat exchanger.

Under certain conditions it is possible to utilize the aforedescribed system without the fish thawing feature. Thus, where a source of cool water (such as sea water) is available the thawing tank structure T may be by-passed by means of a line 90 extending between lines 34 and 22. A valve 92 is interposed in this line 90. During normal operation the valves 32 and 92 are closed. When desired, however, valves 32 and 92 may be opened and valves 23 and 35 closed. Cool fresh or seawater can then be admitted to the concentrate sump 24 and recirculated through the heat exchanger 32 by lines 26, 29, 34 and 90. Also, if desired, the valve 92 may be used to admit a desired amount of seawater to the sump 24, such added amount supplementing the original thaw water.

A very important advantage of the present invention is that it reduces or eliminates "spotting" of the cans during the retorting operation. This "spotting" occurs where the retort cooling water contains contaminants, such as various mineral salts, that produce spots on the cans when the latter dry after retorting. In time, portions of these spots may rust so as to produce can damage. With the present method the steam condensate from the retorts may be accumulated in hot water tank 60 during successive retorting operations until such condensate forms the major portion of the retort cooling water. This condensate is pure of spot-producing elements and, accordingly, "spotting" of the cans will be avoided. This antispotting characteristic will prove particularly important in areas having limited water supplies or areas having especially high percentages of spot-forming elements.

From the foregoing description it will be apparent that the method of the present invention permits more economical operation of a fish canning plant. This method eliminates the necessity of either providing a continuous flow of steam retort cooling water or alternatively of recooling such water. The method insures precise temperature control of the thaw water. Additionally, it is not necessary to employ seawater for thawing purposes. This eliminates the danger of water pollution. It moreover permits the solids extracted by the thaw water to be utilized for preparing a nutritional product. The cleaning and packing schedules of the fish canning plant may be more accurately coordinated inasmuch as the temperature of the thaw water can be carefully controlled. By virtue of such careful temperature control it is also possible to effect uniform cooling of the fish. This permits considerable savings in the fish butchering operation. Finally, the present method reduces can "spotting."

Various modifications and changes may be made with respect to the foregoing detailed description without departing from the spirit of the present invention or the scope of the following claims.

I claim:

1. In the canning of initially frozen fish by means including can retort means, the steps comprising: providing a first body of liquid that is removed from said can retort means at a first temperature; providing a second body of liquid that is physically isolated from said first liquid body; circulating said first liquid body through a heat exchange zone; and circulating said second liquid body over said fish and through said heat exchange zone whereby the heat contained in said first liquid body as it is removed from said retort means is transferred to said second liquid body so as to raise the temperature thereof while lowering the temperature of said first liquid body from said first temperature.

2. In the canning of initially frozen fish by means including can retort means, the steps comprising: providing a first liquid body comprising the cooling water and condensate from said can retort means; providing a second body of liquid that is physically isolated from said first liquid body; circulating said first liquid body through a heat exchange zone; and circulating said second liquid body over said fish and through said heat exchange zone whereby the heat contained in said first liquid body as it is removed from said retort means is transferred to said second liquid body so as to raise the temperature thereof while lowering the temperature of said first liquid body.

3. In the canning of initially frozen fish by means including can retort means, the steps comprising: providing a first body of liquid that is removed from said can retort means at a first temperature; providing a second body of liquid that is physically isolated from said first liquid body; circulating said first liquid body through a heat exchange zone; circulating said second liquid body over said fish and through said heat exchange zone whereby the heat contained in said first liquid body as it is removed from said retort means is transferred to said second liquid body so as to raise the temperature thereof while lowering the temperature of said first liquid body from said first temperature; and processing said second liquid body to extract the nutritional products contained therein.

4. In the canning of initially frozen fish by means including can retort means, the steps that include: providing a first liquid body comprising the cooling water and condensate from said can retort means; providing a second body of liquid that is physically isolated from said first liquid body; circulating said first liquid body through a heat exchange zone; circulating said second liquid body over said fish and through said heat exchange zone whereby the heat contained in said first liquid body as it is removed from said retort means is transferred to said second liquid body so as to raise the temperature thereof while lowering the temperature of said first liquid body; and processing said second liquid body to extract the nutritional products contained therein.

5. In the canning of fish by means including can retort means, the steps comprising: depositing cans of fish within said retort means; admitting steam into said retort means to heat said can; collecting the condensate from the steam admitted into said retort means; admitting a quantity of cooling water to said retort means to cool said cans; adding said condensate to said quantity of cooling water, with said condensate and said quantity defining a first body of liquid; circulating said first liquid body through a heat exchange zone to reduce its temperature; removing said cans from said retort means; and recirculating said first liquid body back through said retort means whereby the proportion of said condensate to said first quantity of cooling water is increased.

6. A method according to claim 5 wherein seawater is circulated through said heat exchange zone, said seawater being physically isolated from said first liquid body.

7. A method according to claim 5 wherein the fish being canned is initially frozen and water utilized to thaw said fish is circulated through said heat exchange zone, said thaw water being maintained physically isolated from said first liquid body.

References Cited in the file of this patent
UNITED STATES PATENTS

| | | |
|---|---|---|
| 1,184,252 | Luhrmann et al. | May 23, 1916 |
| 2,058,849 | Bergen | Oct. 27, 1936 |
| 2,411,188 | Borg | Nov. 19, 1946 |